(12) United States Patent
Saurenman et al.

(10) Patent No.: US 10,398,229 B2
(45) Date of Patent: Sep. 3, 2019

(54) CORNER ARRANGEMENT FOR AN ARTICLE OF FURNITURE, ARTICLE OF FURNITURE, AND METHOD OF MAKING THE SAME

(71) Applicant: GULFSTREAM AEROSPACE CORPORATION, Savannah, GA (US)

(72) Inventors: Edward Saurenman, Cahokia, IL (US); Paul Heidenfelder, Cahokia, IL (US); Kyle Stange, Cahokia, IL (US); Grace Anne Peters, Thornton, CO (US); Valentine Korenak, Cahokia, IL (US)

(73) Assignee: Gulfstream Aerospace Corporation, Savannah, GA (US)

( * ) Notice: Subject to any disclaimer, the term of this patent is extended or adjusted under 35 U.S.C. 154(b) by 654 days.

(21) Appl. No.: 14/694,573

(22) Filed: Apr. 23, 2015

(65) Prior Publication Data
US 2016/0309897 A1    Oct. 27, 2016

(51) Int. Cl.
*A47B 96/20* (2006.01)
*B32B 3/12* (2006.01)
(Continued)

(52) U.S. Cl.
CPC .............. *A47B 96/201* (2013.01); *B32B 1/00* (2013.01); *B32B 3/12* (2013.01); *B32B 3/18* (2013.01); *B32B 3/263* (2013.01); *B32B 3/28* (2013.01); *B32B 7/12* (2013.01); *B32B 15/12* (2013.01); *B32B 15/14* (2013.01); *B32B 15/20* (2013.01); *B32B 2260/021* (2013.01);
(Continued)

(58) Field of Classification Search
CPC ........... A47B 96/201; B32B 7/12; B32B 3/28; B32B 3/263; B32B 3/18; B32B 1/00; B32B 15/20; B32B 15/14; B32B 15/12; B32B 3/12; B32B 2605/18; B32B 2479/00; B32B 2260/046; B32B 2260/028; B32B 2260/023; B32B 2260/021; B32B 2605/003
See application file for complete search history.

(56) References Cited

U.S. PATENT DOCUMENTS 2,068,771 A * 1/1937 Sherman .............. B65D 81/054
                                                             206/586
2,160,221 A * 5/1939 Masters ............... B65D 5/5033
                                                              156/207
(Continued)

*Primary Examiner* — Jonathan C Langman
(74) *Attorney, Agent, or Firm* — LKGlobal | Lorenz & Kopf, LLP

(57) ABSTRACT

A corner arrangement for an article of furniture includes, but is not limited to a first core having a first end and a second core having a second end. The second core is adjacent to, and substantially transverse to, the first core such that the first end and the second end form a corner. The corner arrangement further includes a first skin extending and adhered along an outer surface of the first core and a second skin extending and adhered along an outer surface of the second core. The second skin further extends and is adhered around an outside portion of the corner and along either a portion of the outer surface of the first core or a portion of the first skin. The first skin and the second skin cooperate to affix the second core to the first core without any mechanical fasteners.

4 Claims, 6 Drawing Sheets

(51) Int. Cl.
- *B32B 7/12* (2006.01)
- *B32B 15/12* (2006.01)
- *B32B 15/14* (2006.01)
- *B32B 15/20* (2006.01)
- *B32B 1/00* (2006.01)
- *B32B 3/18* (2006.01)
- *B32B 3/26* (2006.01)
- *B32B 3/28* (2006.01)

(52) U.S. Cl.
CPC ... *B32B 2260/023* (2013.01); *B32B 2260/028* (2013.01); *B32B 2260/046* (2013.01); *B32B 2479/00* (2013.01); *B32B 2605/003* (2013.01); *B32B 2605/18* (2013.01)

(56) References Cited

U.S. PATENT DOCUMENTS

| | | | | |
|---|---|---|---|---|
| 3,337,111 A | * | 8/1967 | Petriekis | B65D 5/5033 206/586 |
| 3,415,025 A | * | 12/1968 | Walz, Jr. | E04H 1/12 52/222 |
| 3,734,389 A | * | 5/1973 | Brown | B65D 81/054 206/586 |
| 5,048,689 A | * | 9/1991 | McFarland | B65D 5/5033 206/586 |
| 5,212,003 A | * | 5/1993 | Homer | F16B 5/01 428/116 |
| 5,219,403 A | * | 6/1993 | Murphy | F16L 9/003 137/561 A |
| 6,789,367 B1 | * | 9/2004 | Dando | F16B 5/01 52/271 |
| 2006/0163910 A1 | * | 7/2006 | Behr | B62D 29/043 296/181.2 |
| 2011/0006651 A1 | * | 1/2011 | Leng | A47B 47/042 312/265.5 |
| 2015/0239226 A1 | * | 8/2015 | Franck, III | B32B 38/0012 156/153 |

* cited by examiner

CORNER ARRANGEMENT FOR AN ARTICLE OF FURNITURE, ARTICLE OF FURNITURE, AND METHOD OF MAKING THE SAME

TECHNICAL FIELD

The present invention generally relates to furniture and more particularly to a corner arrangement for an article of furniture.

BACKGROUND

An ever-present concern when designing and building an aircraft is to minimize its weight. One factor which contributes to the weight of an aircraft is the furniture installed onboard. Some aircraft include a wide variety of furniture onboard the aircraft. One common article of furniture onboard a business jet is a cabinet which can be the galley for storing utensils and other food service related items, the crew quarters for storing flight-related equipment, and a private cabin for various and sundry items of the passenger's choosing.

Cabinets and other articles of furniture onboard aircraft are commonly constructed by aircraft finishers (business entities that build-out the aircraft's interior) who custom build furniture for use onboard the aircraft. Conventionally, an aircraft finisher will purchase panels of structural material (e.g., composite panels, wood panels, aluminum panels, honeycomb panels with carbon fiber, fiberglass, and aluminum skins) that are used in the fabrication of an article of furniture. They will also purchase the skins or veneers (e.g, wood veneer) that are placed on the panels to give the completed article of furniture an aesthetically pleasing appearance. The aircraft finishers join the panels together to form the article of furniture they are trying to construct and then they cover the panels with the veneers. In many instances, the skins and cores are bonded together before being fastened together and are quite often purchased this way. Veneers are added after the cabinet structure has been formed. Once the article of furniture is complete, the aircraft finishers install the article of furniture onboard the aircraft.

Conventionally, the individual panels of the article of furniture are joined together by panel pins. Panel pins are configured to mechanically connect separate panels. The edges of each panel are aligned with one another to form a corner and the panel pins are inserted into an edge of one of the panels. In some applications, an adhesive is applied to the edges of the panels to assist the panel pins in binding the two panels together. In this manner, joints are formed between two panels. As part of this conventional construction process, holes must be drilled in each panel in a manner that precisely aligns with holes that are drilled in each adjoining panel. The panels must then be aligned and the pins are then inserted into the holes, and then adhesive is injected into the pins. This is a labor intensive and time consuming process.

The cabinets and other articles of furniture are subjected to rigorous mechanical testing to measure their ability to withstand tension and shear forces. In order to pass the tests, conventional cabinets that utilize panel pins in their construction have to be made using panels that are thicker/stronger/heavier than would otherwise be necessary in order to accommodate joint strength requirements. Consequently, the use of panel pins to form joints between panels adds considerable weight to the finished article of furniture because of the need to use overly robust panels and panel pins.

While articles of furniture made using panel pins are fine products, there is room for improvement. It is desirable to provide an article of furniture that does not utilize panel pins in its assembly. In addition, it is desirable to provide a method for assembling such an article of furniture that is less time consuming and labor intensive. Furthermore, other desirable features and characteristics will become apparent from the subsequent summary and detailed description and the appended claims, taken in conjunction with the accompanying drawings and the foregoing technical field and background.

BRIEF SUMMARY

A corner arrangement for an article of furniture, an article of furniture, and a method of making an article of furniture are disclosed herein.

In a first non-limiting embodiment, the corner arrangement includes, but is not limited to, a first core having a first end. The corner arrangement further includes, but is not limited to, a second core having a second end. The second core is positioned adjacent to the first core such that the second core is oriented substantially transverse to the first core and such that the first end and the second end form a corner having an outside portion and an inside portion. The corner arrangement further includes, but is not limited to, a first skin extending and adhered along an outer surface of the first core. The corner arrangement still further includes, but is not limited to, a second skin extending and adhered along an outer surface of the second core. The second skin further extends and is adhered around the outside portion of the corner. The second skin further extends and is adhered along one of a portion of the outer surface of the first core and a portion of the first skin. The first skin and the second skin cooperate to affix the second core to the first core without any mechanical fasteners.

In another non-limiting embodiment, the article of furniture includes, but is not limited to, a first core having a first end. The article of furniture further includes, but is not limited to a second core having a second end. The second core is positioned adjacent to the first core such that the second core is oriented substantially transverse to the first core and such that the first end and the second end form a corner having an outside portion and an inside portion. The article of furniture further includes, but is not limited to a first skin extending and adhered along an outer surface of the first core. The article of furniture further includes, but is not limited to a second skin extending and adhered along an outer surface of the second core, the second skin further extending and adhered around the outside portion of the corner, and the second skin further extending and adhered along one of a portion of the outer surface of the first core and a portion of the first skin. The first skin and the second skin cooperate to affix the second core to the first core without any mechanical fasteners. The article of furniture further includes, but is not limited to a third core affixed to the second core to form a second corner. The article of furniture still further includes, but is not limited to a fourth core affixed to the third core and to the first core to form a third corner and a fourth corner. The first core, the second core, the third core, and the fourth core cooperate to form a housing.

In yet another non-limiting embodiment, the method includes, but is not limited to the step of setting up a fixture in a manner that includes a first corner. The method further includes, but is not limited to, positioning a first skin and a second skin in the fixture such that, at the first corner, the second skin one of overlaps and underlaps the first skin. The method further includes, but is not limited to, positioning a first core and a second core in the fixture such that the first core and the second core form a second corner free of mechanical fasteners, such that the second corner is aligned with the first corner, and such that the second skin wraps around the second corner. The method further includes, but is not limited to, compressing the fixture, the first skin, the second skin, the first core, and the second core. The method further includes, but is not limited to, curing an adherent between the first skin, the second skin, the first core and the second core. The method still further includes, but is not limited to, removing an assembly of the first core, the second core, the first skin, and the second skin from the fixture.

BRIEF DESCRIPTION OF THE DRAWINGS

The present invention will hereinafter be described in conjunction with the following drawing figures, wherein like numerals denote like elements.

DETAILED DESCRIPTION

Figure 1:
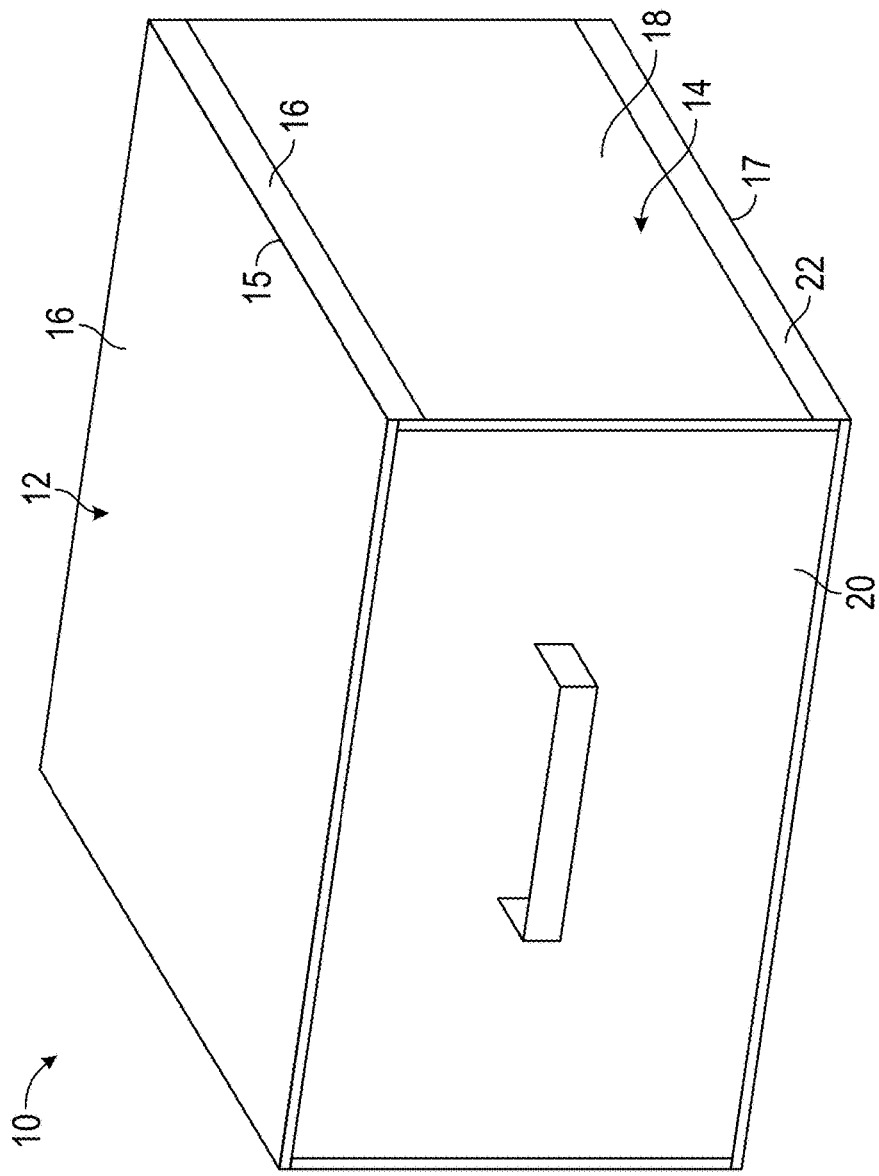
FIG. 1 is a perspective view illustrating a non-limiting embodiment of a cabinet, including a drawer, made in accordance with the teachings herein.

The following detailed description is merely exemplary in nature and is not intended to limit the invention or the application and uses of the invention. Furthermore, there is no intention to be bound by any theory presented in the preceding background or the following detailed description.

An improved article of furniture is taught herein utilizing an improved corner arrangement that does not require or include the use of mechanical fasteners (e.g., panel pins, screws, nails, rivets, inserts, and metallic brackets). Not only do such mechanical fasteners add undesired weight, but installing mechanical fasteners also increases the assembly time of the article of furniture and also increases the number of tools required for fabrication. In a non-limiting embodiment, the article of furniture taught herein includes cores that are held together via skins. Although the discussion below centers around a cabinet for use onboard an aircraft, it should be understood that the corner arrangement discussed herein is not limited to use in a cabinet. The corner arrangement disclosed herein may be implemented on any type of furniture and/or monument for use onboard an aircraft, marine vessel, and any other type of vehicle. For example, the corner arrangement disclosed herein may be implemented on galleys, credenzas, divan cabinets, storage boxes, and the like. Furthermore, the teachings disclosed herein are not limited to use with vehicles but may be implemented in a wide variety of furniture and structure applications. The cores may be made from any suitable material, including, but not limited to, foam, structural foam, hardwood, plywood, fiberboard, honeycomb core (aluminum, aramid, carbon, paper), metallic sheet of various materials (aluminum, steel, titanium and the like). The skins may be made from any suitable material, including, but not limited to wood board, wood veneer, plywood, paper, metallic sheet of any suitable material, pre-impregnated fiberglass, carbon fiber, aramid; wet lay-up using dry fiber cloth of carbon fiber, fiberglass, aramid. At the corners or other junctures where the cores meet, the skins have a region of overlap. This overlap binds the cores together forming a single body.

In an example where a first core and a second core come together to form a corner, a first skin may extend along an entire outer surface of the first core and be affixed thereto by a suitable adhesive. In some embodiments, a layer of prepreg may serve as the combination of the skin and the adhesive. For the sake of simplification, the examples discussed below describe the use of any suitable adhesive being applied to the skin in any suitable fashion, but it should be understood that in each instant, prepreg and a film adhesive may be used. In an embodiment, the first skin will not extend beyond the edge of the first core. A second skin may extend along an entire outer surface of the second core and may be affixed thereto by a suitable adhesive. In some embodiments, a layer of prepreg may serve as the skin. In an embodiment, the second skin will extend beyond the edge of the second core. The film adhesive will also extend beyond the edge of the second core in embodiments where prepreg is employed. The second skin (and film adhesive, if employed) is wrapped around the corner where the second core meets the first core. The second skin overlays the first core and is adhered to the first core. In some embodiments, the second skin lays on top of, and is adhered to, the first skin. In other embodiments, the second skin is positioned underneath the first skin and lays on top of, and is adhered to, the first core.

In some examples, a second pair of skins are applied in a similar manner to the opposite sides of the first and second cores. Thus, one set of skins will wrap and overlap at an outside portion of the corner and another set of skins will wrap and overlap at an inside portion of the corner. The overlapping and the adhering of skins to one another in the corner region of the article of furniture is what binds the first core and the second core together. This is accomplished without the use of any panel pins. Testing has shown that articles of furniture having corner arrangements made in accordance with these teachings meet or exceed the performance exhibited by conventional corner arrangements utilizing panel pins, while at the same time reducing the complexity, the part count, and the weight of the article of furniture as well as reducing the number of tools required for fabrication.

A greater understanding of the corner arrangement described above as well as an the article of furniture employing the corner arrangement and the method of making the article of furniture may be obtained through a review of the illustrations accompanying this application together with a review of the detailed description that follows.

FIG. 1 is a perspective view illustrating a cabinet 10 made in accordance with the teachings of the present disclosure. Cabinet 10 includes a top core 12, a bottom core (not shown in FIG. 1), a right side core 14, a left side core (not shown in FIG. 1), a rear core (not shown) and a drawer 20. Top core 12, right side core 14, the left side core, the bottom panel, and the rear core form a housing that is configured to receive drawer 20 and that permits drawer 20 to move inwardly and outwardly between a closed position (illustrated) and an open position (not shown). Top core 12 and right side core 14 meet and form a corner 15. Similarly, right side core 14 and the bottom core (not shown in FIG. 1) meet and form a corner 17.

Top core 12 is covered by a skin 16 and right side core 14 is covered by a skin 18. As illustrated in FIG. 1, skin 16 wraps around corner 15 and overlaps right side core 14. The bottom core (not shown in FIG. 1) is covered by a skin 22. Skin 22 wraps around corner 17 and overlaps right side core 14. In the illustrated embodiment, skins 16 and 22 overlap skin 18, but it should be understood that in other embodiments, skins 16 and/or 22 could instead underlap skin 18 without departing from the teachings of the present disclosure. Skins 16, 18, and 22 bind right side core 14 to top core 12 and to the bottom core (not shown in FIG. 1). As will be discussed below, skins 16 and 22 also bind the left side core (not shown in FIG. 1) to top core 12 and to the bottom core (not shown in FIG. 1).

Figure 2:
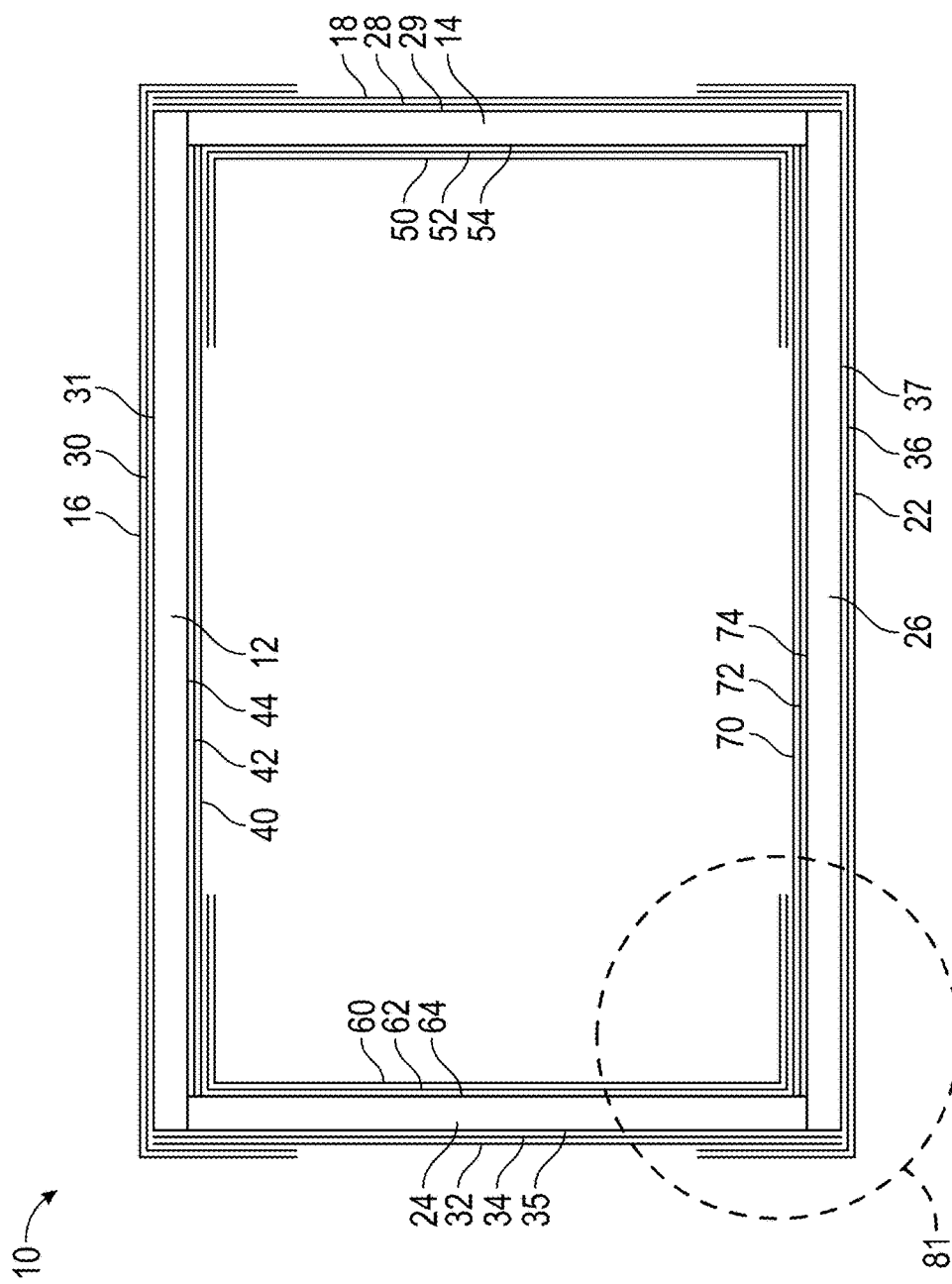
FIG. 2 is a front view illustrating the cabinet of FIG. 1 without the drawer.

With continuing reference to FIG. 1, FIG. 2 is a front view illustrating of cabinet 10 with drawer 20 removed. With drawer 20 removed, the housing formed by top core 12, right side core 14, a left side core 24, and a bottom core 26 can be clearly seen. Additionally, to facilitate this discussion, the cores, the various layers of skin, and various layers of adhesive have been illustrated in a manner that exaggerates the space between these components. In practice, these component would be immediately adjacent, and in direct contact, with one another. Here, they are illustrated with space between them to allow the viewer to distinguish between the different layers.

In the illustrated embodiment, each core is covered on an outside surface by both a layer of skin and a layer of adhesive. For example, skin 18 overlays an adhesive layer 28 which, in turn, overlays an outside surface 29 of right side core 14. Skin 16 overlays a film adhesive layer 30 which, in turn, overlays an outside surface 31 of top core 12. A skin 32 overlays an adhesive layer 34 which overlays an outside surface 35 of left side core 24. Skin 22 overlays a adhesive layer 36 which, in turn, overlays an outside surface 37 of bottom core 26. In a similar manner, the inside surfaces of cores 12, 14, 24, and 26 are also covered by skins and adhesive layers. For example, a skin 40 overlays a adhesive layer 42 which, in turn, overlays an inside surface 44 of top core 12. A skin 50 overlays an adhesive layer 52 which, in turn, overlays an inside surface 54 of right side core 14. A skin 60 overlays a adhesive layer 62 which, in turn, overlays an inside surface 64 of left side core 24. A skin 70 overlays an adhesive layer 72 which, in turn, overlays an inside surface 74 of bottom core 26. As used herein, "prepreg" or "prepreg layer" or "prepreg sheet" refers to a ready-to-mold material in sheet form which may be cloth, mat, unidirectional fiber, or paper impregnated with resin.

As illustrated in FIG. 2, cores 12, 14, 24, and 26 are bound together by the various skins and the various layers of adhesive and without the use of any panel pins. In some embodiments, an adhesive may also be applied to the joints where the edges of the cores come together to form the corner of cabinet 10. In other embodiments, the use of a prepreg skin may be adhered directly to the cores and may bind the cores together through the use of a film adhesive. A more detailed discussion of a corner arrangement 81 between left side core 24 and bottom core 26 (identified by the circle drawn in phantom lines in FIG. 2) follows below. It should be understood that the discussion surrounding corner arrangement 81 is equally applicable to each of the corners formed by the various adjoining cores of cabinet 10.

With continuing reference to FIGS. 1-2, FIGS. 3-5 are fragmentary views illustrating various embodiments of corner arrangement 81 for a corner 80 formed when an end 82 of left side core 24 meets an end 84 of bottom core 26. As used herein, reference to a "corner" refers to the corner formed by the adjoined cores, while reference to a "corner arrangement" refers to the assembly of the corner and the skins and the adherent which joins the skins to the cores (e.g., adhesive, prepreg layers, film adhesives). In the illustrated embodiments, cabinet 10 includes a total of four corner arrangements, each of similar construction. In other embodiments, cabinet 10 may include any suitable number of corner arrangements. For the sake of brevity, only corner arrangement 81 will be discussed here in detail, but it should be understood that the teachings described herein with respect to corner arrangement 81 apply with equal force to each corner arrangement of cabinet 10.

Figure 3:
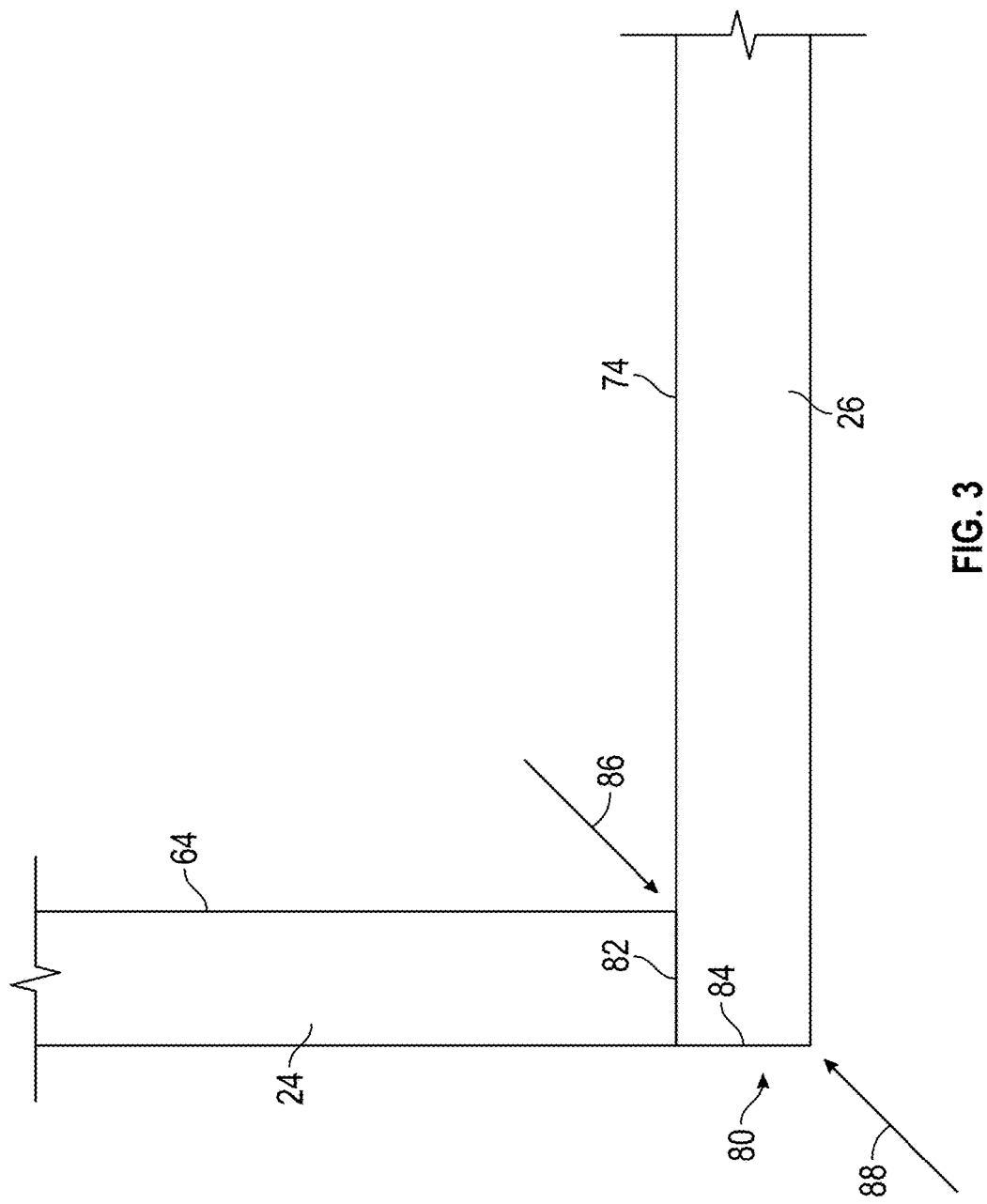
FIG. 3 is an expanded, fragmented, front view illustrating a corner of the cabinet shown in FIG. 2 without skins and without adhesive.

With respect to FIG. 3, and with continuing reference to FIGS. 1-2, the various layers of skins and adhesive have been omitted for ease of illustration and only corner 80 is illustrated. In the illustrated embodiment, end 82 is positioned adjacent inside surface 74. In other embodiments, end 84 may be positioned adjacent inside surface 64. In still other embodiments, ends 82 and 84 may each include complimentary miter cuts while in other embodiments, ends 82 and 84 may have any other suitable configuration that facilitates their assembly with one another.

Corner 80 has an inside portion identified by an arrow 86 and an outside portion identified by an arrow 88. As will be discussed below, the skins and the adhesive layers will be wrapped around both the inside portion and the outside portion of corner 80 to form a corner arrangement in accordance with the teachings herein. In some embodiments, a film adhesive may be used to adjoin layers of prepreg to adjacent components. In still other embodiments, the corner arrangement may include only skins wrapped around either the inside portion of corner 80 or the outside portion of corner 80.

Figure 4:
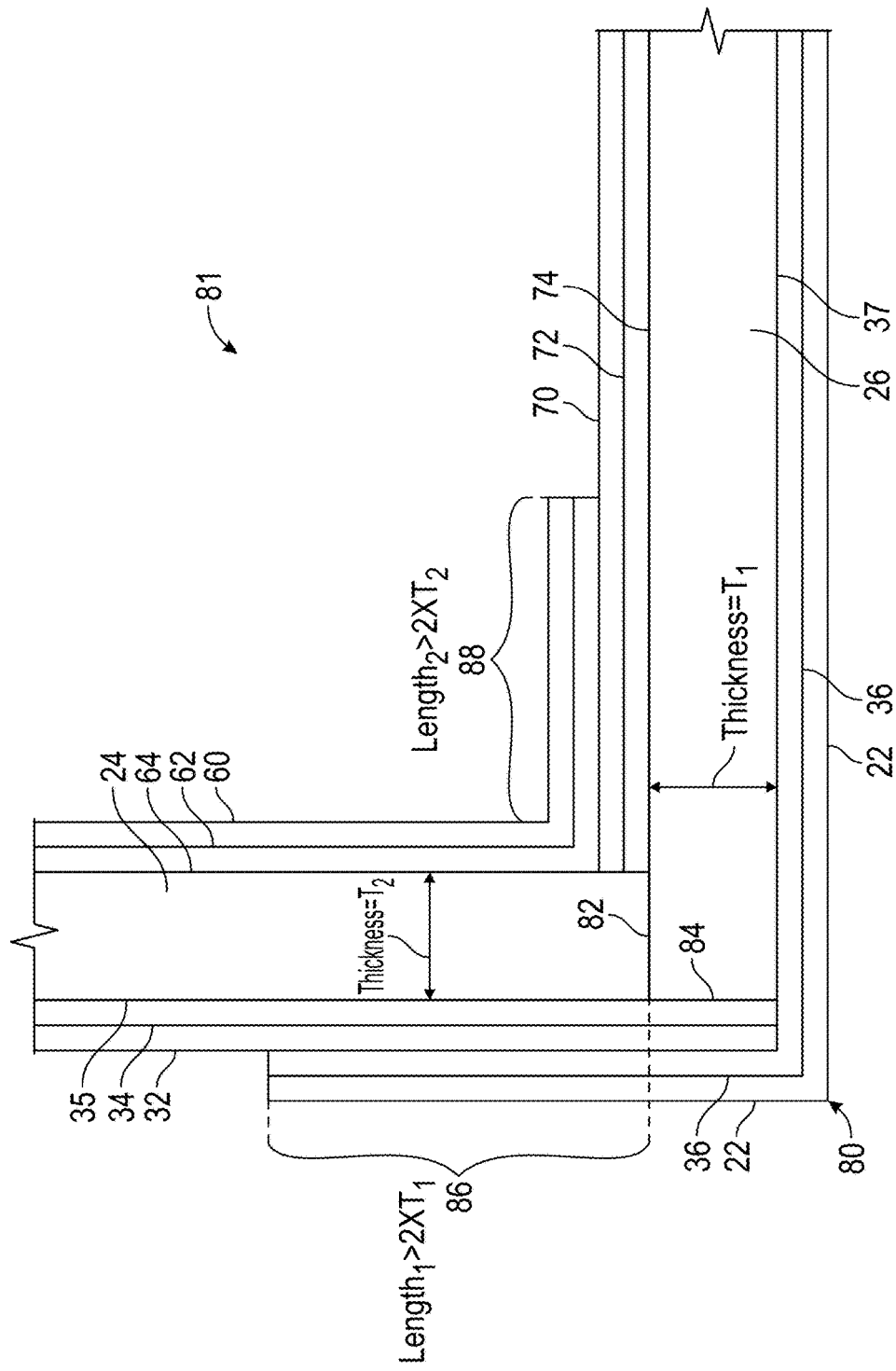
FIG. 4 is an expanded, fragmented, front view illustrating a corner arrangement made in accordance with the teachings herein.
Figure 5:
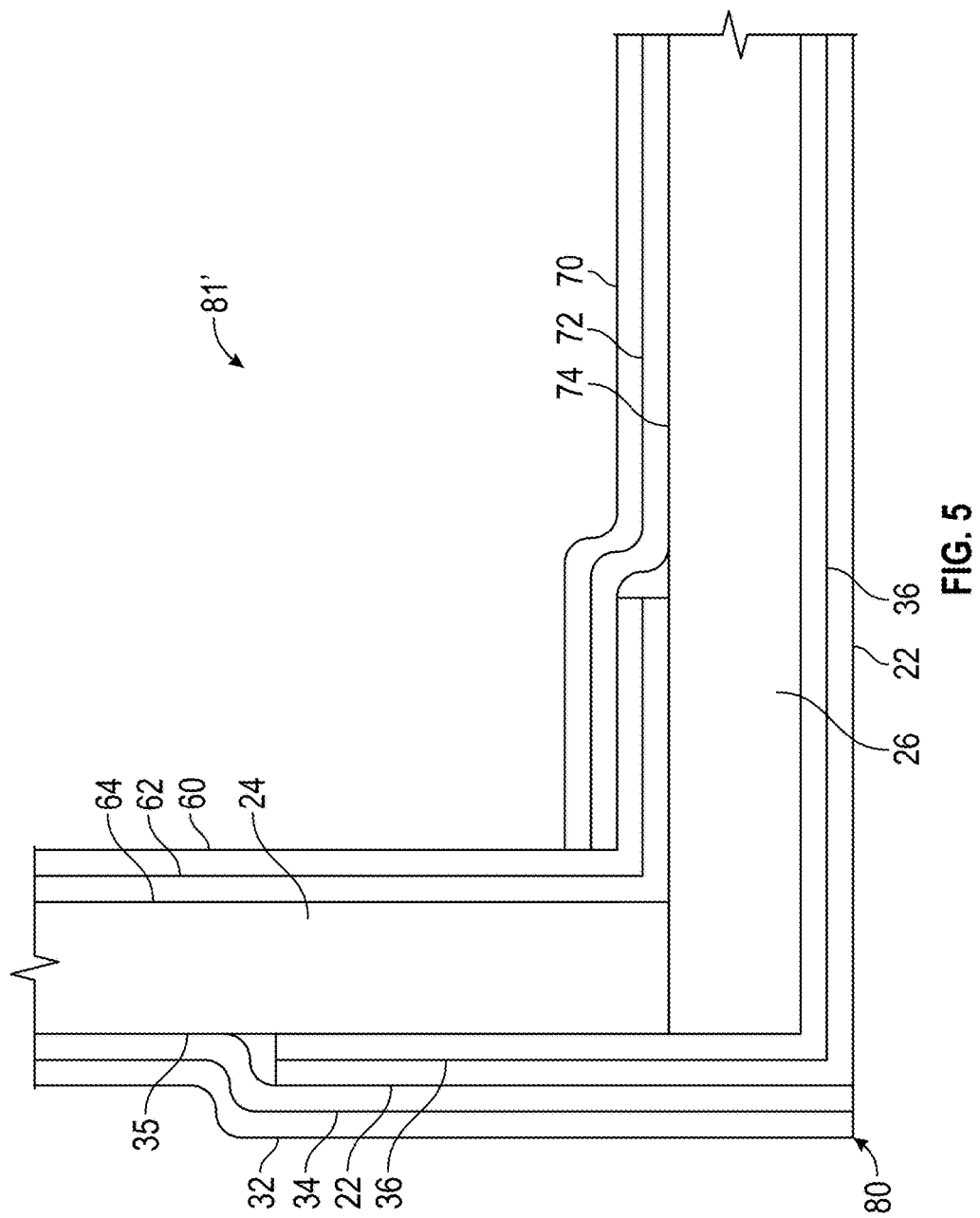
FIG. 5 is an expanded, fragmented, front view illustrating an alternate embodiment of the corner arrangement of FIG. 4.

FIG. 4 illustrates an embodiment of a corner arrangement 81. Corner arrangement 81 includes corner 80, end portions of left side core 24, and of bottom core 26. Corner arrangement 81 also includes end portions of skins 22, 32, 60, and 70 as well as adhesive layers 34, 36, 62 and 72. In corner arrangement 81, skin 22 and adhesive layer 36 wrap around corner 80 and overlap skin 32, adhesive layer 34, and left side core 24. Skin 22 and adhesive layer 36 extend along outer surface 37 of bottom core 26 towards left side core 24, wrap around the outside portion of corner 80, continue to extend along end 84 of bottom core 26, then extend past end 82 of left side core 24, and then continue to extend along skin 32, adhesive layer 34, and outer surface 35 of left side core 24 for a distance indicated by bracket 86. In some embodiments, the distance is equal to at least twice the thickness of bottom core 26. Skin 22 is adhered to bottom core 26 and also to left side core 24 via adhesive layer 36. Similarly, skin 60 and adhesive layer 62 extend along inside surface 64 of left side core 24 toward bottom core 26, wrap around the inside portion of corner 80, and then continue to extend along skin 70, adhesive layer 72, and inside surface 74 of bottom core 26 for a distance indicated by bracket 88. In some embodiments, the distance is equal to at least twice the thickness of left side core 24. By having the skin and adhesive layer from one core overlap (or underlap) the skin and adhesive layer of another core by wrapping around the corner formed by the two cores, a robust, light weight, joint is formed between the two cores when the adhesive layers (or other adhesive) is cured.

With continuing reference to FIGS. 1-4, FIG. 5 illustrates an embodiment of a corner arrangement 81'. Corner arrangement 81' is substantially identical to corner arrangement 81, the primary exception being that skin 22 and adhesive layer 36 underlap skin 32 and adhesive layer 34 and extend along and are adhered directly to outside surface 35 of left side core 24. Similarly, on the inside of corner 80, skin 60 and adhesive layer 62 underlap skin 70 and adhesive layer 72, but extend along and are adhered directly to inside surface 74 of bottom core 26.

In other embodiments, other variations and permutations are possible. For example, in some embodiments, the skins and the adhesive layers from each core may each wrap around their intermediate corner and overlay the adjacent core. In still other embodiments, a single, continuous skin and a single continuous layer of adhesive may wrap around the entire exterior of the article of furniture and a second continuous skin and a second continuous layer of adhesive may wrap around the entire interior of the article of furniture. Other combinations and permutations are also possible.

Figure 6:
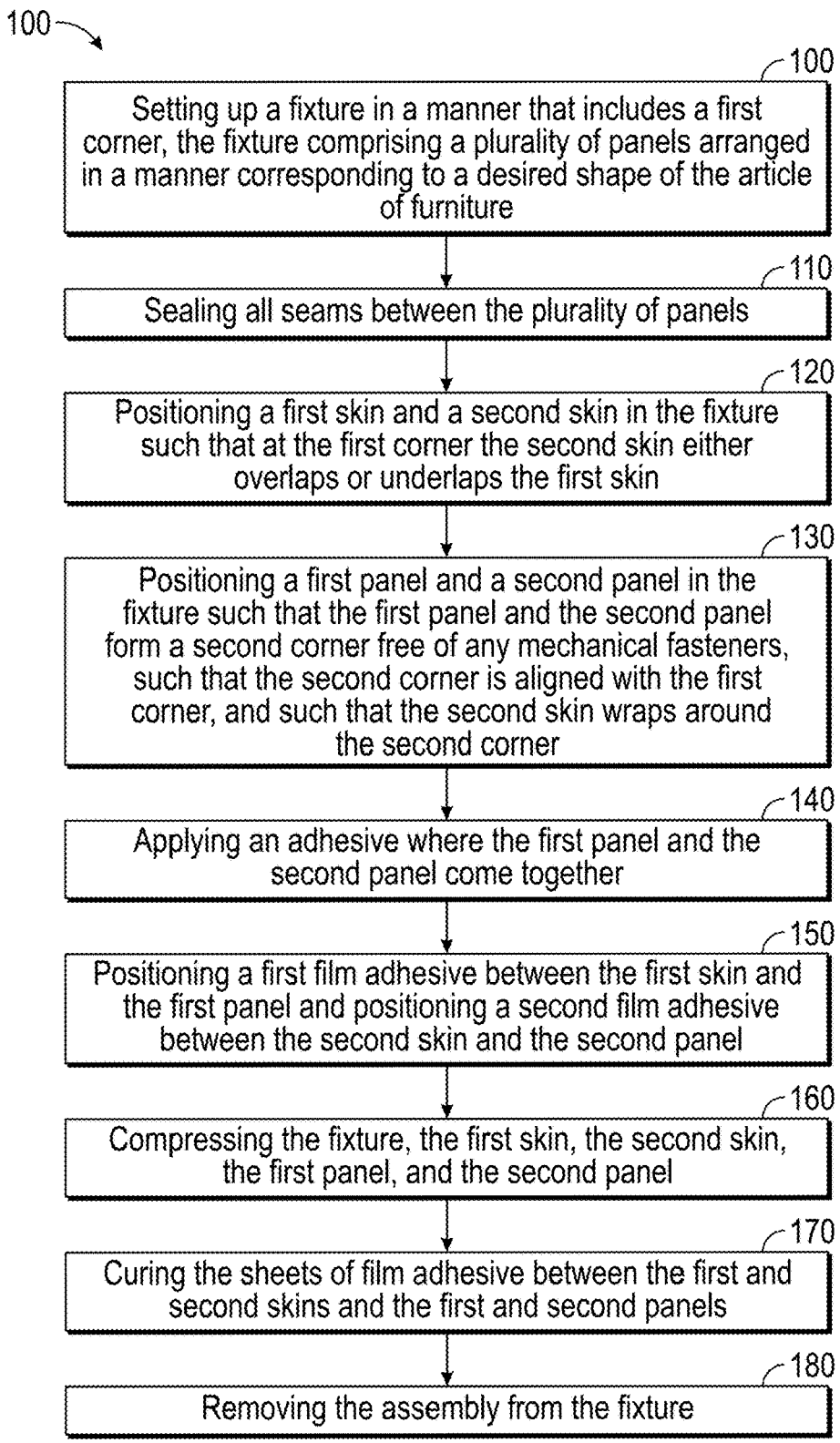
FIG. 6 is a flow diagram illustrating a non-limiting embodiment of a method for assembling an article of furniture made in accordance with the teachings herein.

A method 100 for making an article of furniture that includes a corner arrangement such as corner arrangement 81 and/or corner arrangement 81' will now be described with reference to FIG. 6.

At step 100, a fixture is set up. Fixtures are known in the furniture assembly art. The fixture will include a first corner, and in some embodiments, multiple corners. The fixture will include a plurality of cores that are arranged in a manner that corresponds with the desired shape of the article of furniture. For example, if the desired shape of the article of furniture is a square, then the plurality of cores of the fixture will be arranged in the shape of a square.

At step 110, all of the seams between the various cores of the fixture will be sealed. This may be accomplished via the use of any suitable sealing agent. In one example, the sealing agent may comprise silicon.

At step 120, a first skin and a second skin are positioned in the fixture. The first and the second skin may be made of any suitable material, including, but not limited to, fiberglass, or carbon fiber prepreg or dry cloth, wood board, wood veneer, plywood, paper, metallic sheet of various materials, Pre-impregnated fiberglass, carbon fiber, aramid wet lay-up using dry fiber cloth of carbon fiber, fiberglass, aramid. The first skin and the second skin are arranged such that at the first corner, the second skin will either overlap the first skin or will underlap the first skin, as desired.

At step 130, a first core and a second core are positioned in the fixture. The first and the second cores may be made of any suitable material, including, but not limited to, foam, structural foam, hardwood, plywood, fiberboard, honeycomb core (aluminum, aramid, carbon, paper), metallic sheet of various materials (aluminum, steel, titanium and the like). The first and second panes are positioned in the fixture such that the first and second cores form a second corner that is aligned with the first corner in a nesting fashion. When positioned properly, the second skin will wrap around the second corner.

At step 140, an adhesive may be applied at the second corner where the first core and the second core come together. Any suitable adhesive may be employed including, but not limited to, film adhesive, epoxy, foaming adhesive, and epoxy resin.

At step 150, a first adhesive layer is positioned between the first skin and the first core and a second adhesive layer is positioned between the second skin and the second core. Alternatively, in some embodiments, the first skin and the second skin may each include an integral layer of adhesive. In other embodiments, the first and the second layers of adhesive may be applied to the first and second cores, respectively prior to positioning the first and the second cores in the fixture. In still other embodiments, the first and second layers of prepreg skins may be positioned in the fixture prior to positioning the first and second cores.

At step 160, the first and second cores, the first and second layers of adhesive, and the first and second skins are compressed against the cores of the fixture. In some embodiments, additional fixture cores are positioned against the first and second cores such that first and second cores, the first and second layers of adhesive, and the first and second skins are sandwiched between inner and outer panels of the fixture.

At step 170, the sheets of prepreg (and/or other adhesive) are cured to form a robust bond between the first and second skins, on the one hand, and the first and second cores, on the other hand. In some embodiments, the curing process entails placing the entire fixture, the first and second skins, the first and second layers of adhesive, and the first and second cores in a vacuum bag and evacuating the vacuum bag. This action will place the entire assembly under compression. While compressed in the vacuum bag, the entire assembly may be moved into an autoclave or other heating device and the temperature of the assembly is elevated until the curing temperature of the prepreg is reached. The autoclave/heating device is to be used in accordance with the curing process of the construction materials being used. The assembly will remain at the curing temperature for an amount of time that will permit the layers of prepreg to thoroughly cure.

At step 180, the article of the furniture is removed from the fixture. In some embodiments, this may entail lowering the temperature of the autoclave or other heating device, breaking the vacuum on the vacuum bag, and removing the article of furniture from the vacuum bag.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An article of furniture comprising:
    a first core having a first end;
    a second core having a second end, the second core positioned adjacent to the first core such that the second core is oriented substantially transverse to the first core and such that the first end and the second end form a corner having an outside portion and an inside portion;
    a first skin extending and adhered along an outer surface of the first core; and a second skin extending and adhered along an outer surface of the second core, the second skin further extending and adhered around the outside portion of the corner, and the second skin further extending and adhered along one of a portion of the outer surface of the first core and a portion of the first skin, the first skin and the second skin cooperating to affix the second core to the first core without any mechanical fasteners;

a third core affixed to the second core to form a second corner;

a fourth core affixed to the third core and to the first core to form a third corner and a fourth corner, wherein the first core, the second core, the third core, and the fourth core cooperate to form a housing.

2. The article of furniture of claim 1 wherein the housing is held together by a plurality of overlapping skins and without the use of any mechanical fasteners.

3. The article of furniture of claim 1, wherein the housing comprises a cabinet for installation onboard an aircraft.

4. The article of furniture of claim 1, further comprising a first film adhesive sheet disposed between the first skin and the outer surface of the first core and a second film adhesive sheet disposed between the second skin and the outer surface of the second core and wherein the first skin and the second skin each comprise a layer of prepreg.

* * * * *